Patented Mar. 11, 1952

2,588,892

UNITED STATES PATENT OFFICE 2,588,892

7-DEHYDROSTEROL RHODANIDE AND PROCESS

Jan Strating, Groningen, Netherlands, assignor to Hartford National Bank and Trust Company, Hartford, Conn., as trustee No Drawing. Application April 11, 1950, Serial No. 155,361. In the Netherlands April 14, 1949

3 Claims. (Cl. 260—397.2)

Thiosteroids containing sulphur bonded to the steroid nucleus such, for example, as thiocholesterol have been suggested for the treatment of sulphur deficiencies (cf. U. S. A. Patent Specification No. 2,260,953); it is also expected that such compounds will have a chemotherapeutic action (cf. Wagner-Jauregg and Lennart: Ber. 74, 27 (1941)). Cholesterol-S-pseudo-thioureum-hydrohalide is mentioned in U. S. A. Patent Specifications Nos. 2,375,873 and 2,375,874, having as an object to utilize this compound for the preparation of pharmaceutical products and more particularly of vitamins and hormones. It is furthermore known that 7-dehydrosterols are valuable initial products for compounds influencing the calcium and phosphorus metabolic process.

The present invention relates to a method of preparing a new type of steroids containing the system of double bonds in the sterol nucleus characteristic of 7-dehydrosterols as well as sulphur linked to the sterol nucleus.

The substances to be prepared according to the invention constitute, for example, initial products for the method of preparing thiosterols from sterylrhodanides by conversion with lithium aluminum hydride.

The above-mentioned valuable products prepared according to the invention are 7-dehydrosterol-rhodanides. These compounds have not been described hitherto in literature.

Primarily, two methods enter into consideration for the preparation of such compounds. First, in $\Delta$5-6-unsaturated steryl rhodanides a double bond may be introduced in an otherwise known manner between the carbon atoms 7 and 8. In this method a $\Delta$5-6-sterol rhodanide is first reacted with a halogen compound such as N-dibromoethylurethane, N - bromo - acetamide, N - bromophthalimide, N - bromoacetylurethane, ethyl ester of N-bromoimino-carbonicacid, N-bromo-succinimide V which is capable of introducing a halogen atom at the 7-position in the sterol nucleus thereby yielding a 7-halogenosterol. The latter is then subjected to the action of a dehydrohalogenating agent preferably a tertiary amine such as collidine, quinoline, dimethylaniline, triethylamine or, as the case may be, alcoholic caustic potash or sodium acetate dissolved in glacial acetic acid which split off the corresponding elements of the hydrohalogenic acid and substitute a 7-8 double bond which results in a 7-dehydrosterol-rhodanide.

In the second method a $\Delta$5, 6-7, 8- unsaturated sterol containing a reactive group at the 3-position, such as 7-dehydrocholesterol, 7-dehydrositosterol, 7-dehydro-ergosterol, 7-dehydro-stigmasterol and 7-dehydro-tachysterol is reacted with an alkaline rhodanide such as NaSCN and KSCN which converts the sterol to a sterol rhodanide.

The method according to the invention is of particular importance for the preparation of 7-dehydrocholesterol rhodanide. It will be explained more fully with reference to the following examples.

Example 1

A mixture consisting of 10.7 gms. (0.025 mol.) of cholesteryl rhodanide, 4.635 gms. of N-bromylsuccinimide and 100 cc. of dry carbon tetrachloride is boiled for 12 minutes while being exposed to radiation from a mercury lamp. The succinimide obtained is drawn off and the filtrate evaporated to dryness in vacuo. 20 cc. of dry acetone are added to the brown tough residue, whereupon crystallization occurs. 7 gms. of raw 7-bromo-cholesteryl rhodanide are obtained by cooling, drawing off and washing with the use of a small amount of cold dry acetone. The material may be purified by crystallization from dry acetone; after two crystallizations the melting point is 108–111° C. According to analysis, the product contains 15.10% of bromine. 15.79% of bromine is calculated for 7-bromcholesteryl rhodanide. 8.3 gms. of raw 7-bromcholesteryl rhodanide, together with 40 cc. of dry collidine, are heated for 20 minutes at 140° C. in a carbon dioxide atmosphere, which results in collidine hydrobromide being split off. The cooling process is followed by dilution with ether and the solution is washed with diluted sulphuric acid to remove the collidine, followed by washing with a solution of sodium bicarbonate and finally several times with water. The etheric solution is dried with the use of sodium sulphate. After removal of the ether in vacuo, treatment of the residue with about 10 cc. of acetone and cooling, 1.2 gms. of raw 7-dehydrocholesterol rhodanide are obtained, having a melting point of 130–136° C. The substance is pure after two crystallizations from absolute alcohol; melting point 139–

140.5° C. Analysis: Found C: 78.78, 78.87%; H: 10.21, 10.17%. Calculated for 7-dehydrocholesterol rhodanide, $C_{28}H_{43}NS$ (425.69): C: 79.00%, H: 10.19%. The ultraviolet absorption spectrum of the 7-dehydrocholesteryl rhodanide shows maxima at 274, 285 and 297 m./u. with an $$E_{1\,cm.}^{1\%}$$

of 287, 315 and 189, respectively, and minima at 279 and 293 m./u. with an $$E_{1\,cm.}^{1\%}$$

of 255 and 176, respectively.

*Example 2*

3.8 gms. of 7-dehydrocholesteryl bromide, together with 21.15 gms. of NaSCN, $2H_2O$ and 133 cc. of absolute ethanol are heated for 68 hours at 80° C. in a sealed tube, which has previously been exhausted. The tube then contains a tough mass and an amount of crystalline material. The latter is separated and recrystallized from absolute ethanol. The resulting 7-dehydrocholesteryl rhodanide melts at 139–140.5° C. and is identical with the product obtained according to Example 1.

What I claim is:

1. As a new composition of matter, a 7-dehydrosterol rhodanide.

2. A process for the preparation of a 7-dehydrosterol rhodanide which comprises reacting a Δ5-6-7-8-unsaturated sterol containing a reactive group at the 3-position with an alkaline rhodanide to convert the sterol to a 7-dehydrosterol rhodanide.

3. A process for the preparation of 7-dehydrocholesterol rhodanide as claimed in claim 2, in which the alkaline rhodanide is NaSCN.

JAN STRATING.

REFERENCES CITED

The following references are of record in the file of this patent:

UNITED STATES PATENTS

| Number | Name | Date |
|---|---|---|
| 2,441,091 | Vliet | May 4, 1948 |